United States Patent
Skaaksrud et al.

(10) Patent No.: US 11,734,643 B2
(45) Date of Patent: *Aug. 22, 2023

(54) SYSTEMS AND METHODS FOR RULE-DRIVEN MANAGEMENT OF SENSOR DATA ACROSS GEOGRAPHIC AREAS AND DERIVED ACTIONS

(71) Applicant: FedEx Corporate Services, Inc., Collierville, TN (US)

(72) Inventors: Ole-Petter Skaaksrud, Lakeland, TN (US); Miley Ainsworth, Hernando, MS (US)

(73) Assignee: FedEx Corporate Services, Inc., Collierville, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/881,438

(22) Filed: May 22, 2020

(65) Prior Publication Data

US 2020/0286040 A1    Sep. 10, 2020

Related U.S. Application Data

(63) Continuation of application No. 16/394,085, filed on Apr. 25, 2019, now Pat. No. 10,726,384, which is a
(Continued)

(51) Int. Cl.
*G05B 19/00* (2006.01)
*G05B 23/00* (2006.01)
(Continued)

(52) U.S. Cl.
CPC ....... *G06Q 10/08355* (2013.01); *G06F 21/10* (2013.01); *G06F 21/6245* (2013.01);
(Continued)

(58) Field of Classification Search
CPC ............. G06Q 10/08355; G06F 21/10; G06F 21/6245; G06F 2221/2111; H04L 63/08; H04W 12/06; H04W 64/00
See application file for complete search history.

(56) References Cited

U.S. PATENT DOCUMENTS 6,693,585 B1 * 2/2004 MacLeod .............. G01S 5/0027
342/357.55
7,198,227 B2 * 4/2007 Olin ....................... G06Q 10/08
244/137.1
(Continued)

OTHER PUBLICATIONS

Jia et al., a survey of location privacy preservation in social Internet of vehicles (Year: 2020).*
Vimercati et al., Privacy and Security in Environmental Monitoring Systems (Year: 2012).*
Jia et al., a survey of location privacy preservation (Year: 2020).*
Geofencing, A Useful Way To Corral Your Devices; posted by Katie Lane; Cisco Meraki; Sep. 11, 2013; (3 pages). https://web.archive.org/web/20131023085003/https://meraki.cisco.com/2013/09/geofencing-a-useful-way-to-corral-your-devices/.
(Continued)

*Primary Examiner* — Quang Pham
(74) *Attorney, Agent, or Firm* — Finnegan, Henderson, Farabow, Garrett & Dunner LLP (57) ABSTRACT

The present disclosure relates to an information gathering method. The information gathering method includes identifying a location of a package, the location associated with one or more location-based restrictions on collecting data. The information gathering method also includes restricting access to sensor-collectable data associated with the package in accordance with the one or more location-based restrictions.

20 Claims, 7 Drawing Sheets

Related U.S. Application Data continuation of application No. 15/983,383, filed on May 18, 2018, now Pat. No. 10,304,029, which is a continuation of application No. 14/737,596, filed on Jun. 12, 2015, now abandoned, which is a continuation of application No. 13/351,852, filed on Jan. 17, 2012, now Pat. No. 9,087,213.

(60) Provisional application No. 61/445,260, filed on Feb. 22, 2011.

(51) Int. Cl.

| | | |
|---|---|---|
| *G06F 7/00* | (2006.01) | |
| *G06F 7/04* | (2006.01) | |
| *G08B 29/00* | (2006.01) | |
| *G08C 19/00* | (2006.01) | |
| *H04B 1/00* | (2006.01) | |
| *H04B 3/00* | (2006.01) | |
| *H04L 9/32* | (2006.01) | |
| *H04Q 1/00* | (2006.01) | |
| *H04Q 9/00* | (2006.01) | |
| *G06Q 10/0835* | (2023.01) | |
| *H04W 64/00* | (2009.01) | |
| *G06F 21/10* | (2013.01) | |
| *H04L 9/40* | (2022.01) | |
| *H04W 12/06* | (2021.01) | |
| *G06F 21/62* | (2013.01) | |

(52) U.S. Cl.
CPC ............ *H04L 63/08* (2013.01); *H04W 12/06* (2013.01); *H04W 64/00* (2013.01); *G06F 2221/2111* (2013.01)

(56) References Cited

U.S. PATENT DOCUMENTS

| | | | | |
|---|---|---|---|---|
| 7,252,731 | B2* | 8/2007 | Kaneko | F01N 3/2853 |
| | | | | 156/185 |
| 7,457,693 | B2* | 11/2008 | Olsen | B60R 25/102 |
| | | | | 701/29.3 |
| 7,501,944 | B2* | 3/2009 | Hyde | G01S 19/14 |
| | | | | 340/10.5 |
| 7,791,455 | B1* | 9/2010 | MacLean, III | G01S 7/021 |
| | | | | 340/5.31 |
| 7,843,324 | B2* | 11/2010 | Penney | H03K 17/94 |
| | | | | 340/8.1 |
| 7,974,637 | B1* | 7/2011 | Taveniku | G06Q 10/087 |
| | | | | 705/28 |
| 8,086,952 | B2* | 12/2011 | Edd | G06F 16/958 |
| | | | | 715/229 |
| 8,195,198 | B1* | 6/2012 | Shaw | H04W 48/04 |
| | | | | 455/456.4 |
| 8,212,658 | B2* | 7/2012 | Monroe | A61B 50/30 |
| | | | | 340/568.1 |
| 8,286,005 | B2* | 10/2012 | Matsuda | G06F 21/86 |
| | | | | 713/194 |
| 8,314,704 | B2 | 11/2012 | Cova et al. | |
| 8,555,355 | B2 | 10/2013 | Rathbun | |
| 8,560,274 | B2* | 10/2013 | Gregory | G01N 21/00 |
| | | | | 702/187 |
| 8,885,559 | B2* | 11/2014 | Schmidt | H04W 24/04 |
| | | | | 370/406 |
| 9,177,282 | B2 | 11/2015 | Stevens et al. | |
| 9,194,932 | B2* | 11/2015 | Lee | G06Q 10/0833 |
| 9,330,316 | B2* | 5/2016 | Hicks | H04L 63/107 |
| 9,495,709 | B2* | 11/2016 | Borden | G06Q 10/10 |
| 9,523,775 | B2* | 12/2016 | Chakraborty | G01S 13/74 |
| 9,525,193 | B2* | 12/2016 | Lee | H01M 10/465 |
| 9,607,281 | B2* | 3/2017 | Lee | G06Q 10/0833 |
| 9,974,042 | B2 | 5/2018 | Skaaksrud | |
| 10,358,319 | B2* | 7/2019 | Salmikuukka | B66B 1/2458 |
| 10,438,162 | B2 | 10/2019 | Sharma et al. | |
| 10,623,294 | B2* | 4/2020 | Heliker | G06F 13/4282 |
| 10,730,626 | B2* | 8/2020 | Gil | G08G 5/006 |
| 10,775,792 | B2* | 9/2020 | Cooper | G01C 21/20 |
| 10,990,922 | B1 | 4/2021 | Subramanian et al. | |
| 11,159,498 | B1* | 10/2021 | Casu | H04L 9/0825 |
| 11,386,362 | B1* | 7/2022 | Kim | G06Q 10/047 |
| 2001/0052850 | A1* | 12/2001 | Zimmerman | G06K 17/00 |
| | | | | 340/568.1 |
| 2002/0017989 | A1* | 2/2002 | Forster | G01S 5/0018 |
| | | | | 340/945 |
| 2002/0026278 | A1* | 2/2002 | Feldman | G08G 1/0104 |
| | | | | 701/414 |
| 2002/0062263 | A1* | 5/2002 | Katou | G06Q 10/087 |
| | | | | 379/93.12 |
| 2003/0096623 | A1* | 5/2003 | Kim | G01S 1/047 |
| | | | | 455/457 |
| 2003/0137968 | A1* | 7/2003 | Lareau | G06Q 10/08 |
| | | | | 370/349 |
| 2004/0068502 | A1* | 4/2004 | Vogedes | H04L 63/10 |
| | | | | 707/999.009 |
| 2005/0032529 | A1* | 2/2005 | Akama | H04W 4/029 |
| | | | | 455/456.2 |
| 2005/0251865 | A1* | 11/2005 | Mont | G06F 21/6245 |
| | | | | 726/26 |
| 2006/0013080 | A1* | 1/2006 | Shibata | G06F 21/78 |
| | | | | 369/30.01 |
| 2006/0085419 | A1* | 4/2006 | Rosen | G06Q 30/0267 |
| | | | | 707/999.009 |
| 2007/0210912 | A1* | 9/2007 | Lynt, III | A47B 53/02 |
| | | | | 340/517 |
| 2008/0005561 | A1* | 1/2008 | Brown | H04W 12/02 |
| | | | | 713/164 |
| 2008/0018459 | A1* | 1/2008 | Derrick | G07C 1/20 |
| | | | | 455/456.1 |
| 2008/0072284 | A1* | 3/2008 | Horvitz | G06F 21/6245 |
| | | | | 726/2 |
| 2008/0100475 | A1* | 5/2008 | Horstemeyer | G06Q 10/0833 |
| | | | | 340/994 |
| 2008/0118150 | A1* | 5/2008 | Balakrishnan | G06F 21/6254 |
| | | | | 382/176 |
| 2008/0275829 | A1* | 11/2008 | Stull | H04L 9/00 |
| | | | | 726/26 |
| 2009/0009283 | A1* | 1/2009 | Arts | G08B 13/1418 |
| | | | | 340/5.2 |
| 2009/0117919 | A1* | 5/2009 | Hershenson | H04W 48/04 |
| | | | | 455/456.4 |
| 2009/0158441 | A1* | 6/2009 | Mohler | G06F 21/6209 |
| | | | | 726/27 |
| 2009/0323972 | A1* | 12/2009 | Kohno | H04L 9/0631 |
| | | | | 380/284 |
| 2010/0014676 | A1* | 1/2010 | McCarthy | G06F 21/6272 |
| | | | | 707/E17.001 |
| 2010/0023774 | A1* | 1/2010 | Matsuzaki | G06F 21/85 |
| | | | | 713/168 |
| 2010/0077484 | A1* | 3/2010 | Paretti | H04W 4/023 |
| | | | | 726/1 |
| 2010/0114864 | A1* | 5/2010 | Agam | G06F 16/951 |
| | | | | 707/706 |
| 2010/0151885 | A1* | 6/2010 | Buford | H04L 63/107 |
| | | | | 455/456.3 |
| 2010/0194567 | A1* | 8/2010 | Jung | G08B 13/00 |
| | | | | 340/568.1 |
| 2010/0199102 | A1* | 8/2010 | Knepper | A61M 16/024 |
| | | | | 713/189 |
| 2010/0269674 | A1* | 10/2010 | Brown | G08B 15/00 |
| | | | | 89/1.11 |
| 2010/0318641 | A1* | 12/2010 | Bullard | H04W 4/38 |
| | | | | 370/328 |
| 2011/0018707 | A1 | 1/2011 | Dobson et al. | |
| 2011/0029233 | A1* | 2/2011 | Carpenter | G08G 1/096844 |
| | | | | 701/533 |
| 2011/0068954 | A1* | 3/2011 | McQuade | G06F 16/29 |
| | | | | 340/988 |
| 2011/0078089 | A1* | 3/2011 | Hamm | G06Q 10/0833 |
| | | | | 705/333 |

(56) References Cited

U.S. PATENT DOCUMENTS

| | | | | |
|---|---|---|---|---|
| 2011/0125402 | A1* | 5/2011 | Mitsugi | G08G 1/167 701/532 |
| 2011/0138483 | A1* | 6/2011 | Bravo | G06F 21/43 455/411 |
| 2011/0143716 | A1* | 6/2011 | Shaw | H04M 1/65 455/411 |
| 2011/0145927 | A1* | 6/2011 | Hubner | H04L 63/10 709/224 |
| 2011/0164595 | A1* | 7/2011 | So | H04W 12/06 370/338 |
| 2011/0167144 | A1* | 7/2011 | Nakamoto | H04N 1/00145 709/223 |
| 2012/0162422 | A1* | 6/2012 | Lester | G07F 13/025 348/148 |
| 2012/0214506 | A1* | 8/2012 | Skaaksrud | H04W 4/029 455/456.1 |
| 2012/0216252 | A1* | 8/2012 | Skaaksrud | H04W 12/06 726/30 |
| 2012/0299824 | A1* | 11/2012 | Hoshuyama | G10L 15/26 704/E15.005 |
| 2012/0310854 | A1 | 12/2012 | Cova et al. | |
| 2015/0262123 | A1 | 9/2015 | Sharma et al. | |

OTHER PUBLICATIONS

Heydon; Bluetooth Low Energy the Developer's Handbook; Oct. 2012; Prentice Hall; USA (368 pages).
Guidelines for Seafood Retailers; Govt. of Australia Dept. of Fisheries, Feb. 2002 (45 pages).
An Analysis of the Requirements, Current Conditions and Opportunities for Traceability in the British Columbia Seafood Sector; Jun. 2005 (177 pages).
SiLabs; Optimizing Current Consumption in Bluetooth Low Energy Devices; Version 2.13 (https://docs.silabs.com/bluetooth/2.13/) (12 pages).
Tiwari; An Introduction To QR Code Technology; *2016 International Conference on Information Technology*, IEEE Xplore (6 pages).
Vice Article; How the Railroad Industry Invented, Then Immediately Discarded, The Barcode; Oct. 24, 2017 (https://ww.vice.com/en/article/gv38wp/how-the-railroad-industry-invented-then-immediately-discarded-the-barcode) (6 pages).

\* cited by examiner

| Location | Restrictions |
|---|---|
| Location A | No Audio |
| Location B | No Video<br>No Temperature |
| Location C | None |

FIG. 6

FIG. 7

SYSTEMS AND METHODS FOR RULE-DRIVEN MANAGEMENT OF SENSOR DATA ACROSS GEOGRAPHIC AREAS AND DERIVED ACTIONS

RELATED APPLICATION

This application is a continuation of U.S. application Ser. No. 16/394,085, filed Apr. 25, 2019, which is a continuation of U.S. application Ser. No. 15/983,383, filed May 18, 2018, now U.S. Pat. No. 10,304,029, which is a continuation of U.S. application Ser. No. 14/737,596, filed Jun. 12, 2015, which is a continuation of U.S. application Ser. No. 13/351,852, filed Jan. 17, 2012, now U.S. Pat. No. 9,087,213, which claims priority from U.S. Provisional Application No. 61/445,260, filed Feb. 22, 2011, the entire contents of all of which are hereby incorporated by reference in their entirety.

TECHNICAL FIELD

The present disclosure generally relates to the field of computerized systems. More particularly, the disclosure relates to computerized systems and methods of rule driven management and/or encryption of sensor data across geographic areas and derived actions.

BACKGROUND INFORMATION

Data privacy is generally understood as the relationship between the collection and dissemination of data, available technology, the public expectation of privacy, and the surrounding legal and political issues. Privacy concerns exist wherever personally identifiable information (PII) is collected and stored in digital form or otherwise. Improper or non-existent disclosure control can be the root cause for privacy issues. The U.S. government used the term "personally Identifiable" in 2007 in a memorandum from the Executive Office of the President, Office of Management and Budget (OMB), and that usage now appears in US standards such as the NIST *Guide to Protecting the Confidentiality of Personally Identifiable Information* (SP 800-122). The OMB memorandum defines PII as follows: "Information which can be used to distinguish or trace an individual's identity, such as their name, social security number, biometric records, etc. alone, or when combined with other personal or identifying information which is linked or linkable to a specific individual, such as date and place of birth, mother's maiden name, etc."

Many countries have established laws to define capabilities and limitations on the collection of data and the form in which that data can be exported. They have also designated regulatory agencies to monitor compliance with these laws. At present, each sovereign state defines its own rules and oversight agency.

Companies engaged in the collection of data across international borders, therefore, should be cognizant of the laws pertaining to each jurisdiction where data is collected. Each jurisdiction may belong to a sovereign country, to a military or security authority, or to a regulatory authority monitoring compliance with a law such as the Health Insurance Portability Authority Act (HIPAA) in the United States. This becomes increasingly important when the data collected also includes information identifying the geographic location where the data was collected. The location information being linked with other collected data may provide the ability to correspond location-specific laws and/or rules of operations to each collected data element.

Companies that are in the business of collecting and disseminating information may operate under strict guidelines for how that information is to be controlled. These restrictions can be very granular, and can even be specific to the individual whose data is being collected. Also, where these companies have defined sales territories, commissions can often be calculated based on the specific geography in which the data capture occurs.

SUMMARY

In accordance with disclosed embodiments, there is provided an Information gathering method comprising: identifying a location of a package, the location associated with one or more location-based restrictions on collecting data; and restricting access to sensor-collectable data associated with the package in accordance with the one or more location-based restrictions.

In accordance with disclosed embodiments, there is further provided a computer-readable medium storing program instructions, which, when executed by at least one processor causes the at least one processor to perform an Information gathering method, comprising: Identifying a location of a package, the location associated with one or more location-based restrictions on collecting data; and restricting access to sensor-collectable data associated with the package in accordance with the one or more location-based restrictions.

In accordance with disclosed embodiments, there is further provided an information gathering system comprising an Information distributor configured to: receive information about a location of a package; look up one or more location-based restrictions on collecting data using the received location information; and instruct a sensor to collect the sensor-collectable data subject to the one or more location-based restrictions.

In accordance with disclosed embodiments, there is further provided a sensor comprising a detecting portion configured to: identify a location of a package, the location associated with one or more location-based restrictions on collecting data; and collect the sensor-collectable data subject to the one or more location-based restrictions.

It is to be understood that both the foregoing general description and the following detailed description are exemplary and explanatory only and are not restrictive of the Invention, as claimed.

BRIEF DESCRIPTION OF THE DRAWINGS

The accompanying drawings, which are Incorporated in and constitute a part of this specification, illustrate disclosed embodiments and together with the description, serve to explain the principles of the disclosed embodiments.

DETAILED DESCRIPTION

This disclosure generally relates to the collection and distribution of Information collected from one or more sensors associated with a package In a delivery network. The sensors are used to collect information associated with packages and the collected information is provided to a distribution service that distributes collected information or otherwise provides access to the collected information. The collection or distribution of, or access to, collected information is subject to restriction Information associated with a package, part or all of a route used to deliver a package, and/or location Information associated with a package.

As explained, circumstances exist for which restrictions may apply to the collection and/or distribution of sensor-collectable Information. For example, certain countries may have regulations that apply to, for example, restrict the collection and/or distribution of (or access to) sensor-collectable information or certain types of sensor-collectable information. Information reflecting these restrictions may be stored in a data repository such as a database system.

The delivery network in one example comprises a network of transportation vehicles such as airplanes, trains, trucks and other means for transporting goods of any type. The delivery network may be used to collect packages from sources (for example, senders) and to deliver the packages to destinations (for example, recipients).

Goods are typically held in a container to form a package. Thus, a package can include one or more types of goods, which require specific conditions during part or all of the transit process between the source and destination, including, for example, perishables or controlled substances. The particular shape or size of a package is not particularly important to this description. The delivery network may deliver packages of a variety of shapes and sizes.

In some embodiments, a package may have its own identifier after being dropped off for shipment. The package, however, may travel with other packages, and may therefore be sent in a physical grouping, such as in a van, plane, unit load device (ULD), or container. When the package is grouped in this way, it may be associated with an identifier of the grouping instead of an individual Identifier. For example, the package may have an Individual identifier when it Is dropped off, but may then be identified by a container number after it is placed in a container with other packages for transit. This re-association of a package's identifier may happen several times during the transit and is typically referred to as a consolidation of the items. For example, after travelling in the container, the package may be then moved to a van, and may be associated with an identifier of the van.

In some embodiments, the location of a package is determined through capture of the consolidated identifier. For example, a back-end may determine the location of the whole container using one or more sensors In the container. Thus, all of the packages associated with the container's identifier, which are located In the container, also have this location information. Thus, individual sensors associated with the packages in the container may derive their location and corresponding rules from the consolidated identifier. In this way, the sensors in the container may share information.

In one example embodiment, one or more sensors may be associated with a package; in other words, the one or more sensors may be placed within a package, attached to a package, or otherwise placed within a vicinity of the package. The precise location of a sensor in relation to the package (within, attached, within the vicinity, or in close proximity, for example) does not matter; what matters Is that the one or more sensors can effectively collect the particular type of information associated with the package and/or Its contents. For example, this sensor-collectable Information may include geographic location and/or other conditions associated with the package or its contents at any given time, including exterior and/or interior temperature of the package, humidity within or about the package, moisture levels within or about the package, altitude of the package, and any other conditions that sensors can collect.

In one example embodiment, an information repository, such a memory or a database with the restriction information may be consulted before one or more sensors associated with a package (in transit in a delivery network from a source to a destination) collects sensor-collectable information on the package. In this way, the collection of sensor-collectable information on a particular (or each) package may be restricted based on the restriction information.

In another example embodiment, the information repository (with the restriction information) may be consulted while a package is in transit in a delivery network from a source (sender) location to a destination (recipient) location, to determine what, if any, sensor-collectable information may be collected (subject to the restriction information), and/or what, if any, sensor-collectable Information that may have been collected may be provided or distributed to (or accessed by) others (subject to the restriction information).

Further, select sensor-collectable information may be consulted as part of the determination to collect other sensor-collectable Information and/or the determination to provide collected information to others. For example, sensor-collectable location information (such as GPS Information, latitude/longitude, address, postal code and the like) associated with a package in transit may be consulted along with restriction information to determine whether to collect other sensor-collectable information and/or the determination to provide information to others. In this way, access to sensor-collectable information on a particular (or each) package may be restricted based on restriction information associated with a package location, part or all of a route used to deliver a package and/or location information associated with a package. Of course access to the collected information may also be subject to permissions set by the sender, recipient, both, the delivery or Information technology network operator, or even a third party associated with a package or the shipment process. Examples of third parties include Customs Agents, Law Enforcements, and FDA.

In some instances a package with one or more sensors for collecting sensor-collectable information may be restricted from the outset of the package's journey from collecting sensor-collectable information. In such a situation, the restriction on the one or more sensors associated with a package may be set at the source (sender) location (or at some other point at the beginning of a journey) in accordance with restrictions from the information repository with the restriction information.

In other instances, the one or more sensors associated with a package is configured to consult with the Information repository while the particular package is in transit to determine whether collection of sensor-collectable information is permitted for that package. Further, in some instances sensor-collectable information on a package is collected while the package is in transit and the restriction information is subsequently consulted to determine whether access to the collected information Is restricted or permitted.

The referenced consultation of restriction information can be effected in a variety of ways. For example, the one or more sensors associated with a package may have as part of each sensor itself, or electronically connected to the one or more sensors, a transceiver, which may be configured to send and/or receive information on a network. The Information repository with package-related restriction information may also be connected to the network. The sensor(s) may comprise or may be associated with a controller or processor, which communicatively connects the sensor(s), which is/are configured to collect the sensor-collectable information, with the transceiver, which is configured to send and receive information on the network. Also, a memory may be included in or associated with the sensor(s), controller/processor, and/or transceiver. This memory may be configured to store information, including sensor-collectable information and/or restriction Information.

In one example embodiment, the transceiver has selected components such as cellular communication module that enable effective communication between sensors associated with packages and the information repository with package-related restriction information while the packages are in transit. Sensors may consult with the repository to determine whether, what and/or when to collect sensor-collectable Information. And the repository may be associated with a system, such as a website, web server, and the like to provide access to collected sensor-collectable information on a package basis and subject to the restriction information associated with each package. Other similar wireless and/or wireline transmission configurations may be used in connection with this disclosure.

In summary, the restriction information may provide an effective access limitation to the collection and distribution of sensor-collectable information in accordance with applicable regulations associated with a package, part or all of a route used to deliver a package, and/or location information associated with a package.

For purposes of this disclosure, a container or package may be a box, envelope or any other media used to ship documentation or products from one point to another. Some of the information collected by sensors, for example, may include data that falls under restriction imposed by the local jurisdiction, company bylaws or other rules.

During transit, individual items may be physically grouped and treated as one tracking unit, at which time, that tracking unit may contain one or more sensors to be managed. In such embodiments, the individual sensors may be aware of the newly formed tracking unit, either directly or indirectly. In some embodiments, information associated with the tracking unit, such as location information, may be provided the associated sensors, either directly or indirectly.

In some embodiments, a sensor determines a location of a package. The package may be in a jurisdiction that has restrictions prohibiting the collection of information, such as temperature, audio, and/or video. Because of these restrictions, the sensor may be prevented from collecting or storing the prohibited information. Moreover, the sensor or an associated data collection and distribution system may restrict access to the prohibited information.

Reference will now be made in detail to exemplary embodiments, examples of which are illustrated in the accompanying drawings. Wherever possible, the same reference numbers will be used throughout the drawings to refer to the same or like parts.

Figure 1:
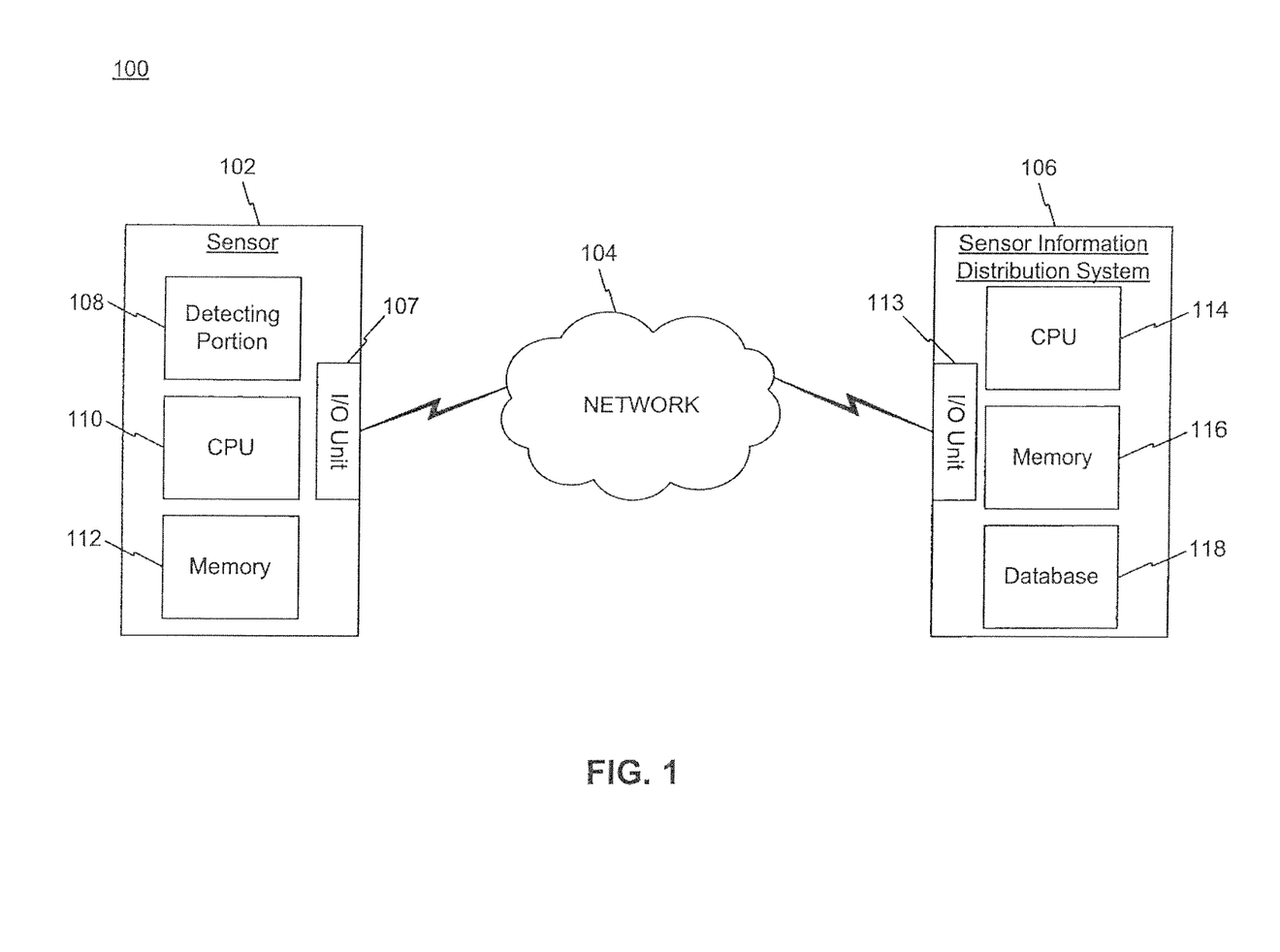
FIG. 1 is an exemplary system for collecting data about the internal and/or external environment of a package.

FIG. 1 illustrates an exemplary system 100 for collecting data about an environment of a package. System 100 may include sensor 102, network 104, and sensor information distribution system 106. Sensor 102 may be in the proximity of a package. For example, sensor 102 may be attached to a package being delivered. Alternatively, sensor 102 may be in the vicinity of a package, such as in the same truck, container, or warehouse.

Sensor 102 may include I/O Unit 107 for sending data over a network or any other medium. For example, I/O Unit 107 may send data over a point-to-point or point-to-multi-point connection either wirelessly or over a cable. Sensor 102 may include detecting portion 108, which may include one or more software and/or hardware components for collecting data about an environment of the package. For example, detecting portion 108 may collect location Information about the package. In some embodiments, location information may include the use of a Global Positioning System (GPS). If GPS is used, detecting portion 104 may use the course acquisition code (C/A Code) utilized In GPS technology.

Alternately, the location information may be determined through cellular triangulation, wireless network association, the capture of fixed location scan, or the capture of mobile location scan. The fixed location and mobile location scans may use 1D or 2D barcodes, or Radio Frequency Identification (RFID). For example, sensor 102 may scan a barcode or read an RFID tag associated with a predefined location. Sensor 102 may be able to look-up the predefined location after the scan using a value associated with the barcode or RFID.

In international locations, multiple global navigational satellite systems may be available. Improved service may be provided by utilizing switching connections, similar to switching between multiple cellular networks. For example NaviStar (US), GLONASS (Russia) and other satellite systems may be available. Thus, detecting portion 104 may switch among different GPS providers when determining location information.

Additionally, adding timing correction or differential GPS with satellite-based augmentation systems may improve the performance of systems in urban canyons and may improve accuracy down to the sub-meter.

In addition to location Information, detecting portion 108 may collect other data about the environment of a package. For example, detecting portion 108 may collect data about temperature, light level, motion, pressure, humidity, gas level, airflow, vibrations, radiation, time, audio, video, orientation, or other environmental conditions. During transit, the environment of some packages may need to be within certain parameters, such as within a certain temperature, pressure, or humidity range. Other information like time, audio, or video may be relevant to determine the circumstances of delivery of the package. For example, the sensor may take a photograph or video of the person accepting the package when the package is delivered, or arrives at an Intermediate destination, like a processing center. The sensor may also take audio or determine a time. Thus, disclosed embodiments may use different types of sensors configured to collect different types of environmental data. In some embodiments sensor 102 may Include numerous detecting portions 108, each of which Is configured to collect a different kind of environmental data. In some embodiments, a single detecting portion 108 may be capable of collecting different kinds of environmental data.

I/O Unit 107 in sensor 102 may send the collected environmental data to sensor information distribution system 106 via network 104 for processing. In some embodiments, sensor 102 may not send the collected environmental data for processing and may perform all or a portion of the processing itself. Moreover, in some embodiments, I/O Unit 107 may not send data over a network, and may send data over a point-to-point or point-to-multipoint connection, either wirelessly or over a cable.

Sensor 102 may also include central processing unit (CPU) 110 and memory 112 to process data, such as the collected environmental data. CPU 104 may include one or more processors configured to execute computer program Instructions to perform various processes and methods. CPU 110 may read the computer program instructions from memory 112 or from any computer-readable medium. Memory 112 may include random access memory (RAM) and/or read only memory (ROM) configured to access and store information and computer program instructions. Memory 112 may also include additional memory to store data and information, such as the collected environmental data, and/or one or more internal databases to store tables, lists, or other data structures.

CPU 110 may Identify one or more data collection rules associated with a location determined by detecting portion 108. In some embodiments, data collection rules may be known as location-based restrictions. Alternatively, Sensor 102 may send the location information to sensor information distribution system 106 over network 104 to identify the one or more data collection rules. The data collection rules may include restrictions associated with the location. These location-based restrictions may prohibit the collection of certain information.

Network 104 may facilitate communications between the various devices in system 100, such as sensor 102 and sensor information distribution system 106. In addition, sensor 102 and sensor information distribution system 106 may access other systems or other entities via network 104, that are not shown in system 100. Network 104 may be a shared, public, or private network, may encompass a wide area or local area, and may be implemented through any suitable combination of wired and/or wireless communication networks. Furthermore, network 104 may comprise a local area network (LAN), a wide area network (WAN), an intranet, or the Internet. In some embodiments, sensor 102 and sensor information distribution system 106 may be directly connected instead of connected through network 104.

Sensor Information distribution system 106 may include an I/O Unit 113 for communicating with sensor 102. I/O Unit 113 may be similar to I/O Unit 107 on sensor 102. Sensor information distribution system 106 may also include a CPU 114 and/or a memory 116, which may be similar to CPU 110 and memory 112 from sensor 102. Sensor information distribution system 106 may also Include database 118. Database 118 may store large amounts of data, and may include a magnetic, semiconductor, tape, optical, or other type of storage device. In some embodiments, database 118 may store historical data for auditing purposes.

System 100 is exemplary only, and the number and distribution of the various entities shown may be different depending on specific embodiments. For example, in some embodiments, sensor 102 may not include CPU 110 and/or memory 112. Other embodiments may include multiple sensors, some with CPU 110 and/or memory 112, and others without. In other embodiments, sensor Information distribution system 106 may be distributed over multiple entities, including other distribution systems, sensors, computers, handheld computers, mobile phones, tablet computers, or other computing platform. Sensor 102 may similarly be Implemented or distributed over any computing platform. Thus, the configuration described in system 100 is an example only and is not intended to be limiting.

In some embodiments, multiple sensors may be located in the same vicinity during transit, such as in the same container or truck. In some of these embodiments, the various sensors may be similar to sensor 102, and may operate together or collectively to share data. For example, there may be one or more lead or master sensors that may obtain instructions or data from sensor information distribution system 106 and may disseminate this Information to other sensors in the vicinity.

Figure 2:
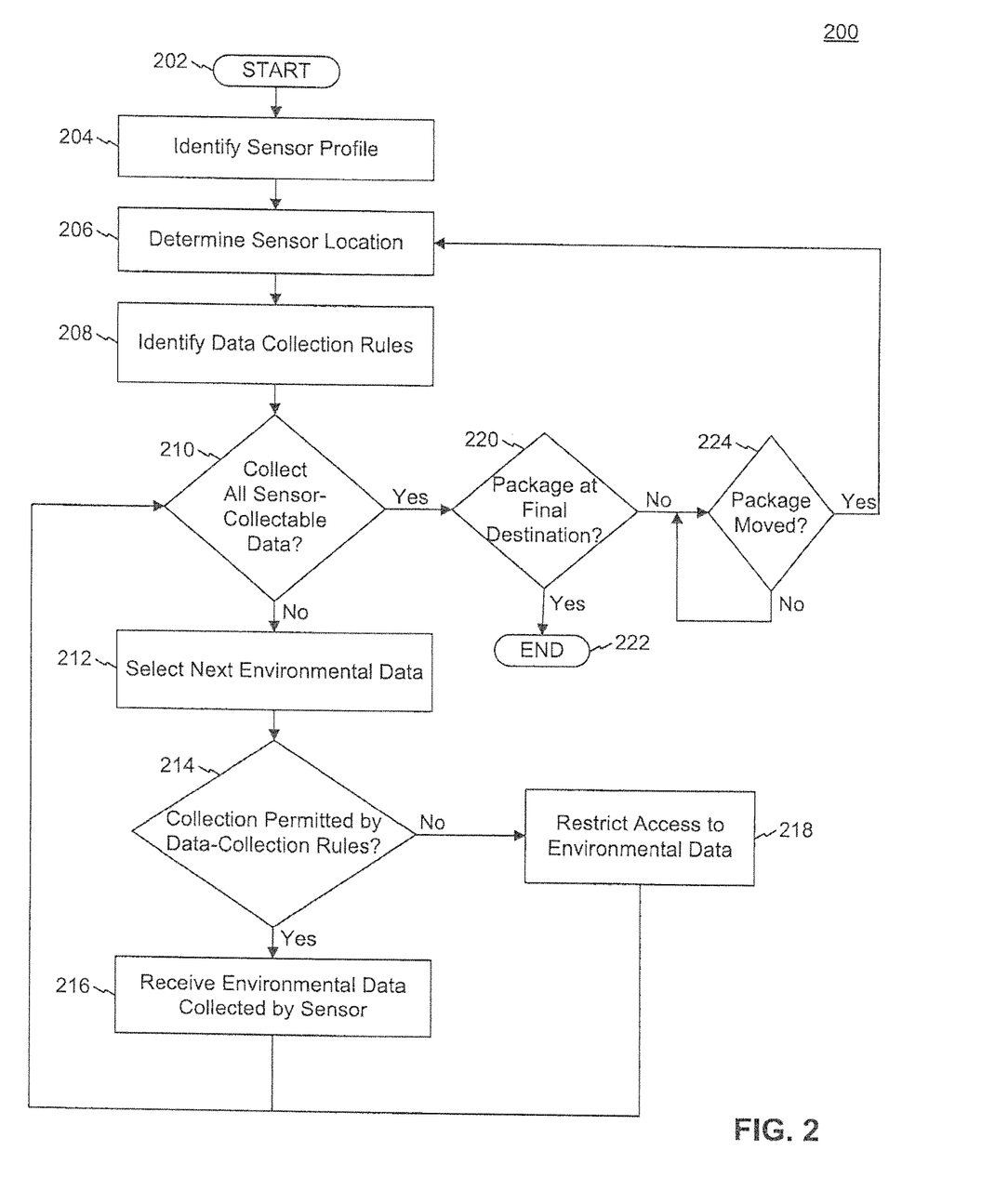
FIG. 2 is a flow diagram Illustrating the operations of an exemplary method for collecting sensor data about the Internal and/or external environment of package.

FIG. 2 illustrates the operations of an exemplary method 200 for collecting sensor data about an environment of package. Method 200 may be executed by CPU 110, CPU 114, or some combination of the two. Accordingly, method 200 may take place on sensor 102 or sensor Information distribution system 106. Moreover, some steps in method 200 may be performed in sensor 102, while other may be performed by sensor information distribution system 106. Method 200 may also be performed in conjunction with other components not shown in system 100. All steps in method 200 are optional and can be rearranged. Additional steps can also be added to method 200.

CPU 110/114 may Identify a profile of sensor 102 (step 204). The profile may indicate the types of environmental data that sensor 102 is capable of capturing. For example, in addition to location information, sensor 102 may only be capable of collecting temperature, video, and audio. The profile Identifies this type of environmental data specific to sensor 102.

Next, CPU 110/114 may determine the location of the sensor, using, for example GPS (step 206). In one embodiment, the location Information is collected by detecting portion 108 of sensor 102 and stored locally on memory 112 for processing. Additionally, or alternatively, sensor 102 may send the location information to sensor Information distribution system 106, via network 104, for storage and/or processing.

CPU 110/114 may identify a set of data collection rules based on the determined location information (step 208). The data collection rules may include restrictions on collecting the type of data collected and/or stored in a particular geographical area. For example, some jurisdictions have privacy laws that prohibit the collection of certain data about individuals. Because delivering a package often involves the identification of a recipient, certain environmental data collected by the sensor may be associated with a recipient and thus may be prohibited. For example, a sensor may be configured to collect photographs when the package is delivered. If the package is delivered in a jurisdiction, such as a particular country that prohibits the collection of images of Individuals, then it may be illegal for the sensor to collect those Images.

Apart from jurisdictional laws on data collection, some companies or other parties may have internal location-dependent data collection rules and/or location-based restrictions on collecting data. For example, a company to which a package is being shipped may not want to collect temperature data. Or the shipping company may not want to collect humidity information in a particular area.

CPU 110/114 may access a database, stored for example in memory 112, memory 116, and/or database 118. The database may store the various data collection rules. The data collection rules may list the types of environmental data that can be collected in a particular location. Alternatively or additionally, the data collection rules may list the types of environmental data that cannot be collected in a particular location, such as location-based restrictions on collecting or providing access to data. CPU 110/114 may determine data collection rules using two criteria: the sensor profile and the collected location Information.

As discussed, the sensor profile indicates the environmental data that sensor 102 is capable of collecting. Thus, CPU 110/114 may identify only those data collection rules that prohibit environmental data that sensor 102 is otherwise capable of collecting. Thus, it may not be necessary for CPU 110/114 to consider a data collection rule that prohibits collecting environmental data that sensor 102 is not capable of collecting.

CPU 110/114 may also use the collected location information to identify data collection rules, since the data collection rules permit or prohibit the collection and/or storage of environmental data in a particular location. Thus, using both the sensor profile and the collected location information of the sensor, CPU 110/114 may determine data collection rules for the sensor. In some embodiments. CPU 110/114 may only use one of the sensor profile or the collected location information to determine the data collection rules, and not both.

In some embodiments, CPU 110/114 may determine more than one set of applicable data collection rules. Thus, it may be necessary to determine a set of data collection rules that takes precedence over the others. For example, for a particular sensor profile and sensor location, CPU 110/114 may determine that data collection rules from Germany apply, as well as internal data collection rules that a delivery network operator has when packages pass through Germany. Because these two rule sets may conflict, CPU 110/114 may need to determine which rule set would take precedence. In some embodiments, CPU 110/114 may select the legal data collection rules as taking precedence, in this example, Germany. In other embodiments, CPU 110/114 may use the most restrictive rules in determining what data can be collected. This may be used if the sensor stores the captured information within its own memory, causing restricted data to cross jurisdictions as the package associated with the sensor travels. In some embodiments, the sensor may store data about laws governing the recipient or the sender, where either could take precedence for the entire journey. One of ordinary skill in the art will recognize that there are many other ways contemplated by the present disclosure to determine which rules take precedence.

As discussed, the data collection rules may permit or prohibit the collection and/or storage of certain environmental data. The data collection rules may also designate override authority based on physical circumstances that may occur while the package is in transit. If the data collection rules are overridden, the data collection rules may hand-off responsibility of data collection from sensor 102 to a local agent or delivery service that may have a better real-time understanding of the specific circumstances involved in the override. For example, if sensor 102 determines that there is an incursion into a container in transit, the delivery service may determine that the container should be re-routed to an inspection agent, such as the Food and Drug Administration (FDA). In this example, the FDA may take over at least partial responsibility of collecting environmental data of the package, and may check for sterility, package integrity, and other environmental data.

After determining the applicable data collection rules by looking at the sensor profile (step 208), CPU 110/114 may determine whether or not it has tried collecting all environmental data that sensor 102 is capable of collecting (step 210). If CPU 110/114 has not yet tried to collect all environmental data that sensor 102 is capable of collecting, then CPU 110/114 selects the next environmental data that CPU 110/114 has not yet tried to collect and that sensor 102 is capable of collecting (step 212).

CPU 110/114 determines whether or not collection and/or storage of the selected environmental data is permitted (or prohibited) by the data collection rules (step 214). If the data collection rules permit collection and/or storage of the selected environmental data, then CPU 110/114 may receive the selected environmental data collected by detecting portion 108 of sensor 102 (step 216). For example, if CPU 110/114 determines that the data collection rules permit collection of temperature Information, then detecting portion 108 may collect the temperature information and provide it to CPU 110/114. In some embodiments, CPU 110/114 may Instruct detecting portion 108 to collect the selected environmental data, and may then store, send, or otherwise process the selected environmental data once collected. In other embodiments, CPU 110/114 may have already collected the selected environmental data, and CPU 110/114 may store, send, or otherwise process the selected environmental data once collected.

Alternatively, if the data collection rules prohibit collection and/or storage of the selected environmental data (step 214), then CPU 110/114 may restrict access to the selected environmental data (step 218). For example, if CPU 110/114 determines that the data collection rules prohibit collection of temperature Information, CPU 110/114 may restrict access to temperature information that detecting portion 108 may be capable of collecting.

CPU 110/114 may restrict access to the environmental data (e.g., temperature) In different ways. In one embodiment, CPU 110/114 may instruct detecting portion 108 of sensor 102 to not collect the prohibited environmental data. In another embodiment, detecting portion 108 may collect the prohibited environmental data, but CPU 110/114 may delete this data or may never read, store, or otherwise consider it. In another embodiment, detecting portion 108 may collect the prohibited environmental data, and CPU 110/114 may store it in such a format so as to obfuscate the environmental data. In some embodiments, obfuscating may mean that the data is stored so as to be unreadable and/or unrecoverable. For example, CPU 110/114 may write multiple fields associated with a sensor at any given time, with one collected environmental data per field. In order to maintain the field data structure, CPU 110/114 may need to write a value into each field, even for data for which collection and storage is prohibited. In those situations, CPU 110/114 may write obfuscated data in those fields. The obfuscated data may not be able to be read or understood.

In some embodiments, obfuscation may change the granularity or specificity of data to protect an identity and/or to avoid classification as PII (personal Identifiable Information). For example, CPU/110/114 may obfuscate an address by storing a zip code of a package recipient in lieu of his/her street address. Alternatively, CPU 110/114 may write other data as a placeholder in those fields. After CPU 110/114 receives environmental data (step 216) or restricts access to environmental data (step 218), CPU 110/114 may return to step 210. If CPU 110/114 determines that it has not yet tried to collect all environmental data that sensor 102 is capable of collecting (step 210), then CPU 110/114 may return to step 212. Alternatively, if CPU 110/114 determines that it has tried to collect all environmental data that sensor 102 is capable of collecting (step 210), the CPU 110/114 may return to step 220.

CPU 110/114 may determine whether or not sensor 102 and its corresponding package are at their final destination (step 220). If the package Is at its final destination, then the process may end (step 222). Alternatively, if the package is not at its final destination, then CPU 110/114 may return to step 224.

CPU 110/114 may determine whether or not sensor 102 (and its corresponding package) have been moved (step 224). If sensor 102 has not been moved, then CPU 110/114 may loop back to step 224 and continue checking to see if sensor 102 has moved. Alternatively, if CPU 110/114 determines that sensor 102 has moved, then it may determine the new sensor location (step 206).

As discussed, aspects of disclosed embodiments may be performed on sensor 102, sensor information distribution system 106, or some combination of the two. In one embodiment, sensor 102 collects environmental data and sends the environmental data to sensor information distribution system 106 to identify the appropriate data collection rule. Sensor information distribution system 106 may be able to identify data collection rules from among a large number of data collection rules stored in memory 116 and/or database 118. In other embodiments, sensor 102 may have sufficient storage in memory 112, or in other storage, to identify the appropriate data collection rules from among a large number of data collection rules.

But in other embodiments, sensor 102 may be a relatively small device and may include limited processing power and storage. In these embodiments, it may be necessary to first determine a route that sensor 102 will take to deliver the package, and to store only those data collection rules on sensor 102 that are applicable for that route. In still other embodiments, sensor 102 may store collection rules, but sensor information distribution system 106 may serve as a backup if CPU 110 and/or memory 112 on sensor 102 fail.

Figure 3:
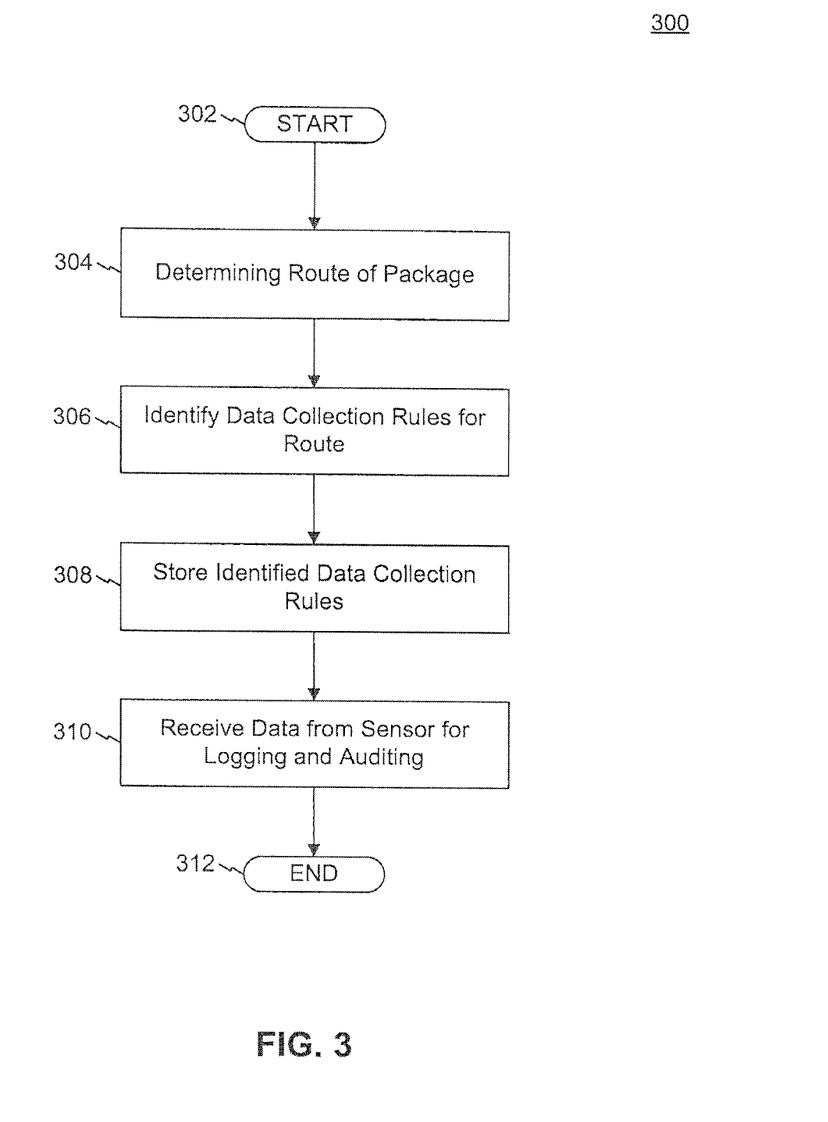
FIG. 3 is a flow diagram illustrating the operations of an exemplary method for storing a subset of data collection rules on a sensor.

FIG. 3 illustrates a process 300 for storing a subset of data collection rules on sensor 102. As discussed, this may take place before sensor 102 and its associated package are shipped. Process 300 may include additional or fewer blocks, or the blocks may be rearranged. Moreover, certain features illustrated in process 300 may be used in embodiments other than those described explicitly in FIG. 3. Process 300 may be performed or executed by CPU 114 of sensor information distribution system 106. In other embodiments, process 300 may be performed by other CPU's, such as CPU 110 of sensor 102, or any other computing platform. Moreover, some steps or features from process 300 may be performed by various different computing platforms.

To begin, CPU 114 may determine a route for delivery of the package (step 302). CPU 114 may determine the route from among a plurality of possible routes. Each of the possible routes may be associated with data collection rules, depending on the locations through which the routes pass. In some embodiments, CPU 114 may identify a preferred delivery route with data collection rules that will maximize the amount of environmental data that can be collected. In other embodiments, the preferred delivery route is selected so that certain desirable environmental data can be collected.

For example, if a package is being shipped from France to the Czech Republic, it can either pass through Germany, or through Switzerland and Austria. Hypothetically, data collection rules for Germany may prohibit the collection of certain environmental data that data collection rules for Switzerland and Austria do not prohibit, for example, temperature. The package recipient, however, may be interested in monitoring the temperature of the package while in transit. CPU 114 may therefore calculate a delivery route for the package that passes through Switzerland and Austria, instead of Germany, so that sensor 102 can track the temperature of the package during delivery.

In some embodiments, CPU 114 may use different rules to determine the package's delivery route. For example, CPU 114 may consider rules for the transportation of goods in addition to or instead of rules for the collection of data. For example, CPU 114 may Identify certain roads that prohibit HAZMAT cargo, and may determine a route that avoids those roads if the packages being delivered are categorized at HAZMAT. This may allow for management of the movement of goods to be driven by regulatory requirements, which may be critical for transit point compliance.

After CPU 114 determines the route it may identify the data collection rules for the route (step 306). In some embodiments, this may be done concurrently with step 304. For example, during or after CPU 114 identifies the delivery route through Switzerland and Germany, it may determine all data collection rules associated with the locations on that route. Moreover, CPU 114 may determine which of the data collection rules take precedence over the others. In some embodiments, CPU 114 may identify data collection rules that conflict, and may resolve those conflicts. For example, CPU 114 may determine that data collection rules associated with a legal jurisdiction take precedence over institutional or corporate data collection rules. Or in some embodiments, CPU 114 may determine that the stricter of multiple conflicting rules takes precedence over the other(s).

Next, CPU 114 may store or download the data collection rules identified in block 306 to sensor 102 (step 308). In some embodiments, CPU 114 may store only the data collection rules that take precedence. In other embodiments, CPU 114 may store all data collection rules associated with the determined route. In some embodiments, CPU 114 may store some or all of the data collection rules on sensor information distribution system 106.

Once the data collection rules are stored on sensor 102, sensor 102 may be able to independently determine what environmental data to collect and/or store, and which environmental data to restrict access to. In some embodiments, sensor 102 may log or store certain actions it takes, such as which data collection rules it stores and when. Sensor 102 may also log when it determines to restrict access to certain environmental data, and the corresponding location of the sensor. Sensor 102 may send this logged data to sensor information distribution system 106. Alternatively, this may be true for sensor information distribution system 106, which may store the data collection rules instead of or in addition to sensor 102.

CPU 114 may receive data from sensor 102 for logging and/or auditing (step 310). In some embodiments, sensor 102 may have logged data of its actions regarding the data collection rules it applies at various locations, as discussed above. The received logged data may be used by Tracking System 102 for logging and auditing purposes. For example, the received data may serve as proof that sensor 102 properly restricted access to certain environmental data that it was not permitted to collect and/or store.

Figure 4:
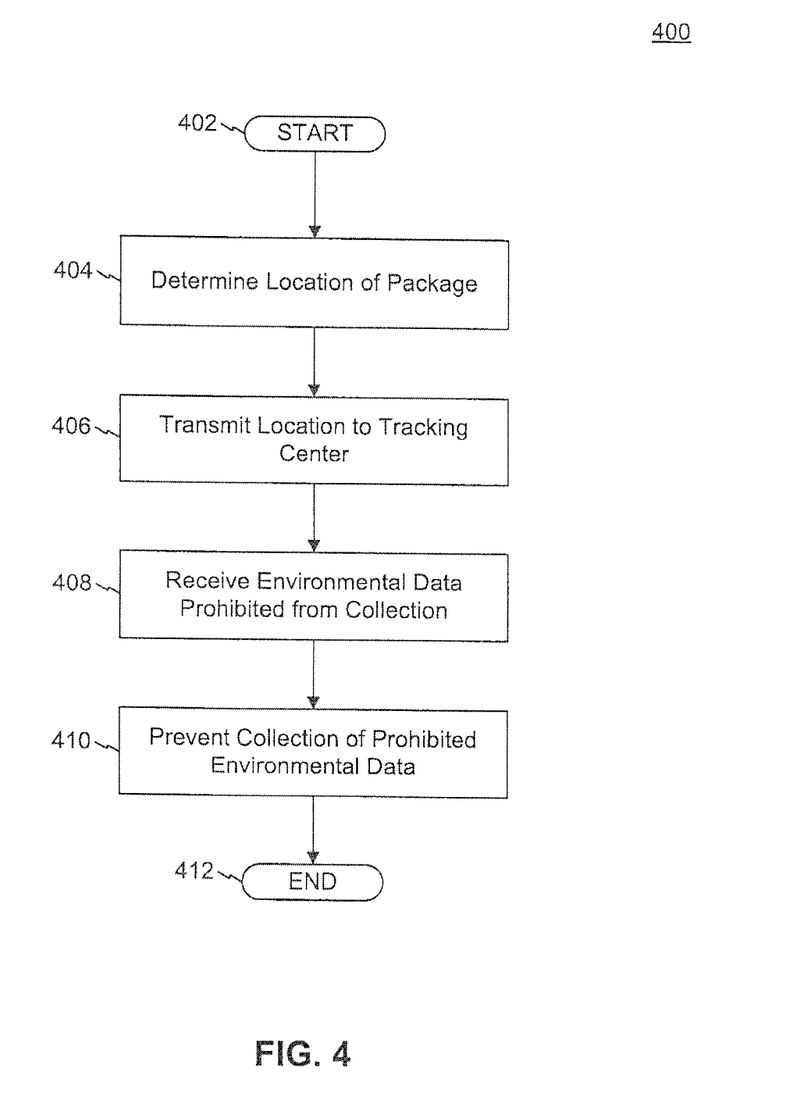
FIG. 4 is a process executing on a sensor In an embodiment of the present disclosure.

FIG. 4 illustrates a process 400 executing on sensor 102 in one embodiment of the present disclosure. Process 400 is a non-limiting example. Sensor 102 may be in proximity of a package in transit being shipped to a destination. Detecting portion 108 of sensor 102 may determine a location of the package (step 404). I/O Unit 107 of sensor 102 may transmit the location to sensor information distribution system 106 (block 406). I/O Unit 107 of sensor 102 may receive a list of environmental data that sensor 102 is prohibited from collecting from sensor information distribution system 106 (block 408). Sensor 102 may prohibit the collection of the environmental data identified by sensor information distribution system 106 (block 410).

Figure 5:
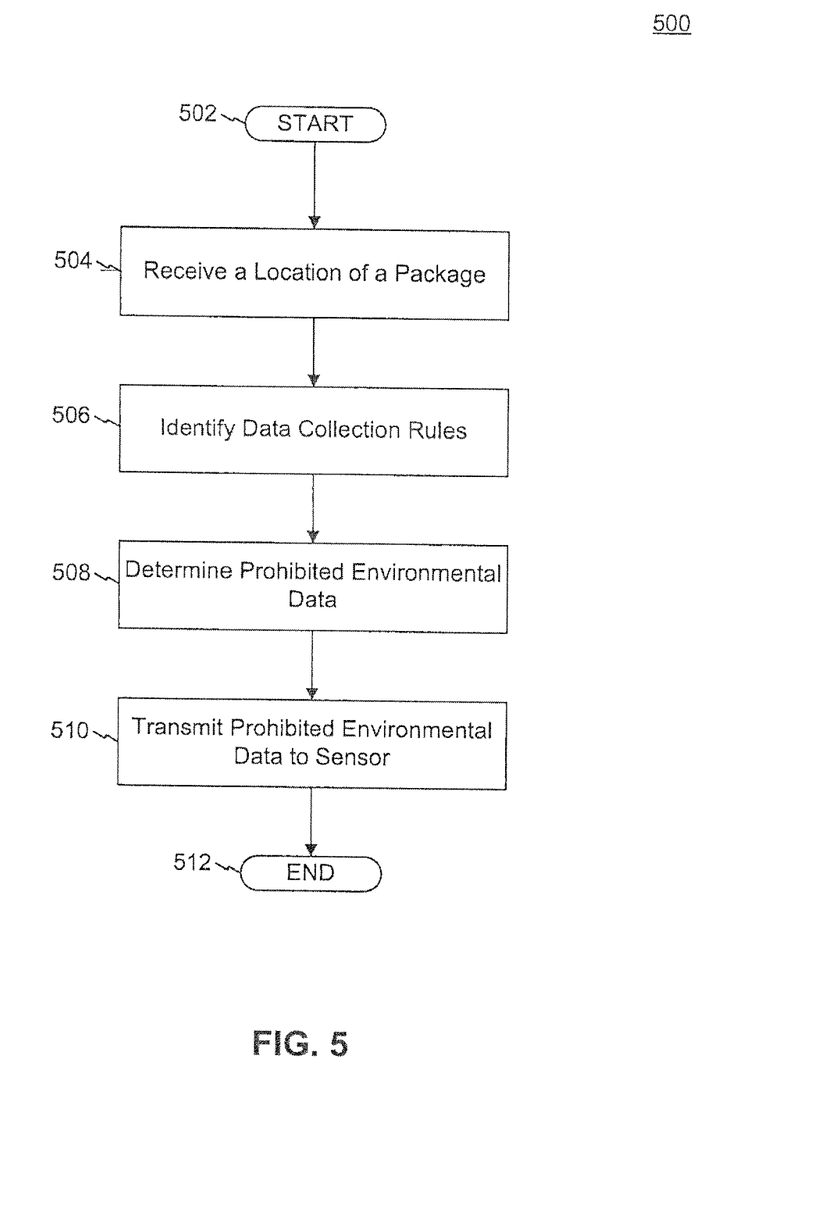
FIG. 5 is a process executing on a sensor information distribution system in an embodiment of the present disclosure.

FIG. 5 illustrates a process 500 executing on sensor information distribution system 106 in one embodiment of the present disclosure. Process 500 is a non-limiting example. I/O Unit 113 of sensor information distribution system 106 may receive a location of a package from sensor 102 (step 504). CPU 114 of sensor information distribution system 106 may identify data collection rules associated with the received location (step 506). The data collection rules may be stored in database 118 of sensor information distribution system 106. The data collection rules may include restrictions on certain types of environmental data that sensor 102 may collect. For example, the restrictions may prohibit sensor 102 from collecting certain environmental data. CPU 114 of Tracking Center 106 may analyze the rules to determine which types of environmental data are prohibited (step 508). I/O Unit 113 of sensor information distribution system 106 may transmit the prohibited types of environmental data (e.g., temperature, video, and/or audio) to sensor 102 (step 510).

Figure 6:
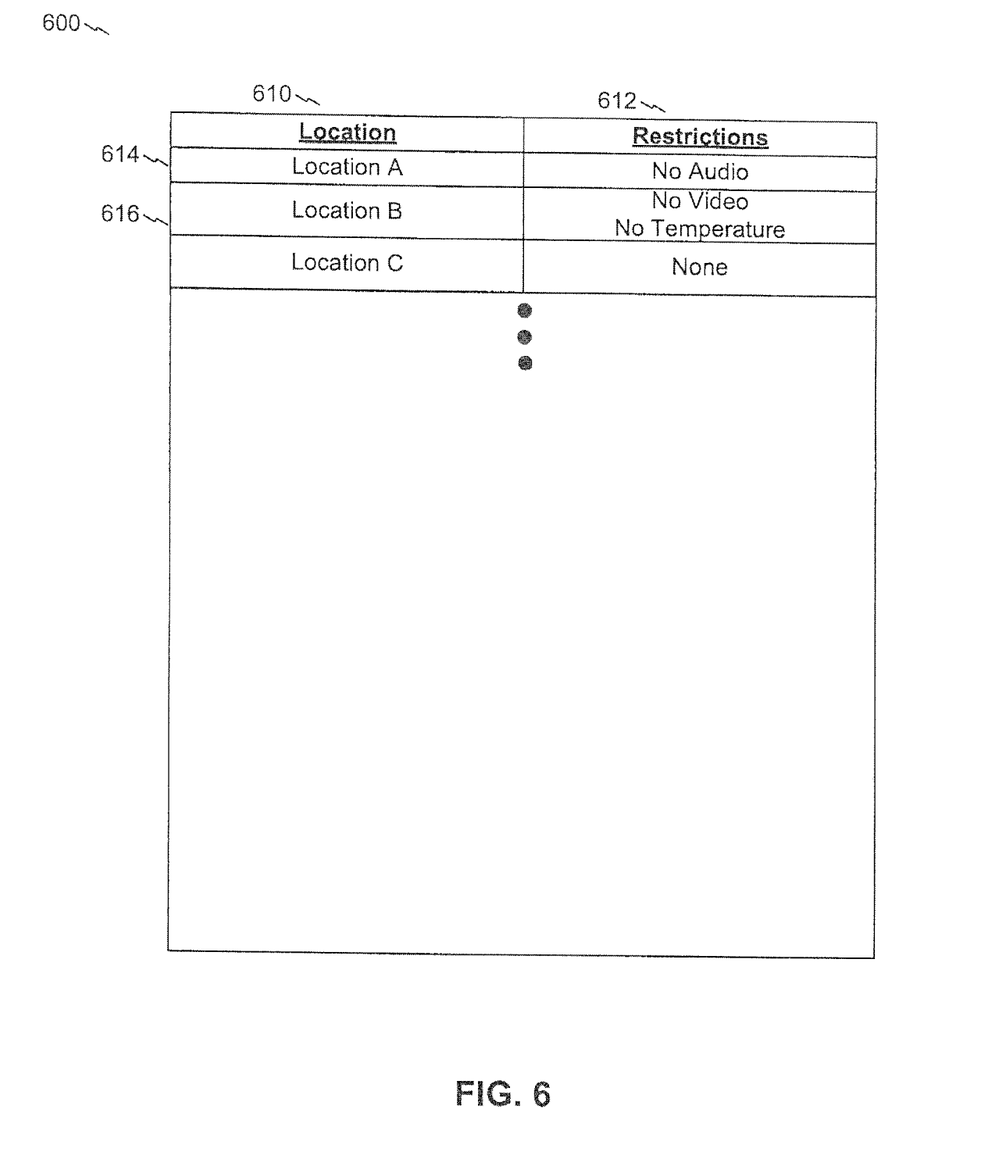
FIG. 6 illustrates a table for storing data collection rules in an embodiment of the present disclosure.

FIG. 6 illustrates an example of a table 600 for storing data collection rules. Table 600 may be stored in memory 112 in sensor 102. Alternatively or additionally, table 600 may be stored in memory 116 and/or database 118 of sensor information distribution system 106. Table 600 may include columns 610 and 620. Column 610 may list various locations that have data collection rules. Column 612 may list the data collection rules for each location. For example, column 612 may list restrictions on data that can be collected in a particular location.

For example, row 614 of table 600 may identify "Location A" as a location and "No Audio" as a restriction. This means that while sensor 102 is in location A, it is not permitted to collect audio information. Similarly, row 616 of table 600 may identify "Location B" as a location and both "No Video" and "No Temperature" as restrictions. This means that while sensor 102 is in location B, it is not permitted to collect either video or temperature information. In some embodiments, table 600 may Include many rows for various locations through which sensor 102 may transit. In another example, row 618 may identify "Location C" as a location and "None" as restrictions. This means that while sensor 102 is in location C, there are no restriction on the data that it can collect.

Sensor 102 may store collected data in an encrypted format In order to protect the privacy of the data. Moreover, some disclosed embodiments may allow restriction of the use or type of encryption that sensor 102 may perform when saving sensor-collectable data, depending on a location of a package or sensor. For example, a package may be travelling to a location where encryption of sensor-collectable data is illegal or restricted, and sensor 102 may need to save data in accordance with local regulations concerning encryption. Many of the same principals discussed above with respect to restricting collection of sensor-collectable data based on location information apply to restricting the encryption of sensor-collectable data based on location information as well.

Figure 7:
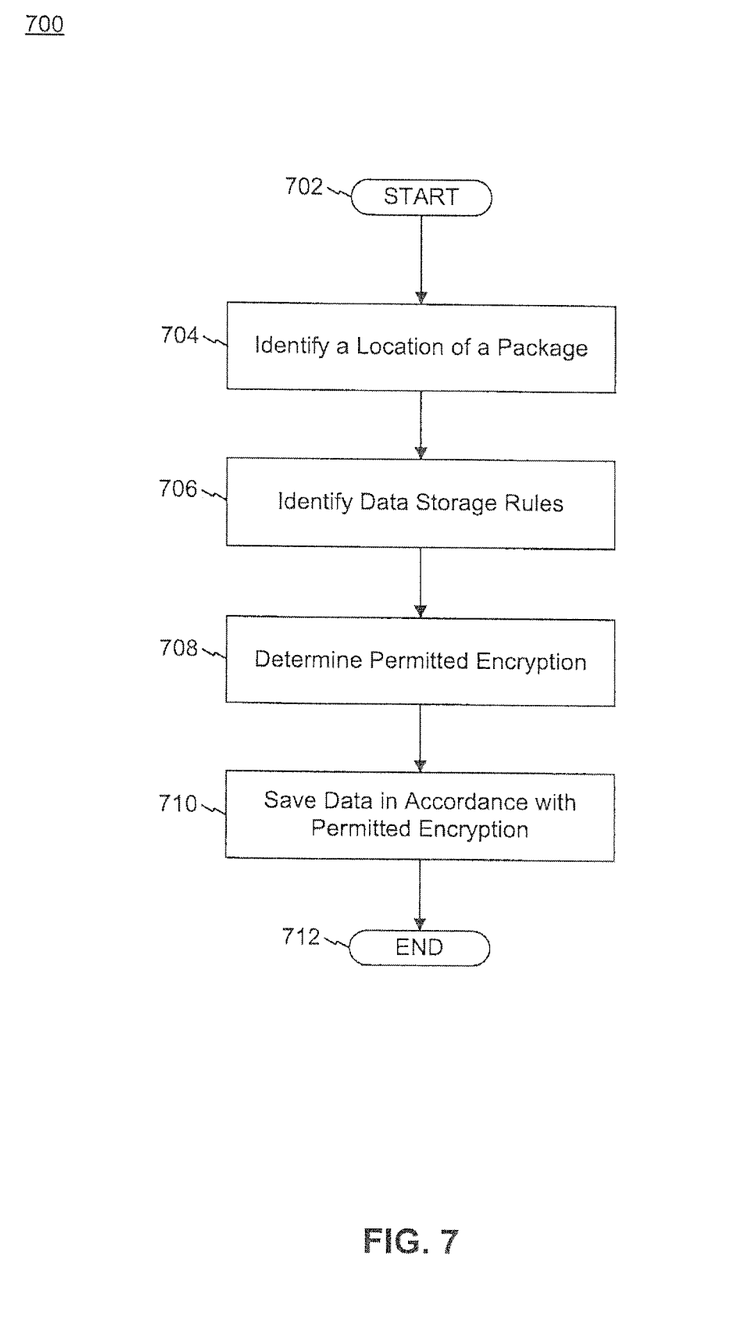
FIG. 7 illustrates a process for saving data in accordance with location-based rules governing encryption.

FIG. 7 illustrates a process 700 for saving data in accordance with location-based rules governing encryption. Process 700 may include additional or fewer blocks, or the blocks may be rearranged. Process 700 may be performed or executed by CPU 114 of sensor information distribution system 106, CPU 110 of sensor 102, any other computing platform, or some combination thereof. Moreover, some steps or features from process 700 may be performed by various different computing platforms.

To begin, CPU 110/114 may identify a location of a package (step 704). For example, CPU 110/114 may determine that a package is travelling from the U.S. and has arrived or is about to arrive in China. CPU 110/114 may determine this information based on GPS, RFID, barcode, or other Information collected by sensor 102, or may independently be aware of a travel schedule of the package. One of ordinary skill will recognize that there are numerous ways In which the location of the package may be determined.

CPU 110/114 may then identify one or more data storage rules associated with the package location (step 706). The data storage rules may indicate a type of encryption permitted for certain types of sensor-collectable data at the location of the package. For example, some jurisdictions may not permit sensor 102 to store sensor-collectable information in an encrypted format. As another example, some jurisdictions may only permit certain types of encryption, such as encryption of certain strengths, having certain algorithms, lengths of ciphers, etc.

Accordingly, CPU 110/114 may determine the encryption permitted by the data storage rules for the location (step 708). For example, if the package is in China, it may be illegal to encrypt certain data collected by the sensor, such as video information. Thus, CPU 110/114 may save the video encryption in an unencrypted format in order to comply with local regulations. Storing the data in an unencrypted format, however, may compromise the privacy of the data because it may be read by anyone with access to the sensor. Accordingly, CPU 110/114 may obfuscate the data in some way to maintain privacy.

For example, if sensor-collectable data is stored on sensor 102 in an unencrypted format, CPU 110/114 may cease the collection of the location information in an attempt to protect the privacy of the sensor-collectable data. For example, CPU 110/114 may determine that unencrypted video information associated with GPS location may compromise the privacy of individuals in the video. Thus, if CPU 110/114 is forced to store the video in an unencrypted format on sensor 102 in China, it may obfuscate GPS Information to protect the privacy of the video Information. When the package moves to another location, such as Germany for example, the sensor may resume encrypting video information and may collect GPS information in accordance with one or more data collection rules associated with Germany.

Other embodiments will be apparent to those skilled in the art from consideration of the specification and practice of the invention disclosed herein. For example, for companies in which sales commissions are calculated based on geographic location, the determination of commission splits based on time of control within a jurisdiction or sales territory may be more readily calculated. For example, a salesperson may work for a company that sells and refills medical kits, and may manage a relationship with a certain hospital. The salesperson may receive a commission depending on the amount of time the medical kit is on the hospital grounds. Sensor 102 accompanying the medical kit may collect environmental data, such as location information. Thus, sensor 102 may determine the amount of time the medical kit is at the hospital, and the salesperson's commission may be calculated accordingly by verifying that the salesperson is operating within his/her sales area. If a second salesperson from the same company has kits within the same sales area, he/she may be in violation of operations rules for that company, possibly affecting the distribution of his/her commission.

In other embodiments, inventory control can be accomplished by determining how much inventory of a given item is in an area, and reallocating the Inventory if a particular location has a surplus of that item. For example, certain jurisdictions may fine a merchant or delivery service if too much of a certain item is in one place. Certain jurisdictions may have rules that no more than a certain amount of drugs containing pseudoephedrine, such as Sudafed, can be in the same place, for fear that it could be turned into methamphetamines. Similar restrictions may exist for other hazardous cargo or dangerous goods. Disclosed embodiments may provide additional needed information about a shipment, such as the amount of Sudafed in a container and its location. If the amount or the total amount of Sudafed across monitored containers within the same geographic area is more than a regulatory threshold, disclosed embodiments may propagate an alert to a user, or reallocate a portion of the shipment. It could also lead to enforcement of the law, leading to fines.

While certain features and embodiments of the invention have been described, other embodiments of the invention will be apparent to those skilled in the art from consideration of the specification and practice of the embodiments of the invention disclosed herein. Furthermore, although aspects of embodiments of the present invention have been described in part as software, computer-executable Instructions, and/or other data stored in memory and other storage mediums, one skilled in the art will appreciate that these aspects can also be stored on or read from other types of tangible, non-transitory computer-readable media, such as secondary storage devices, like hard disks, floppy disks, or a CD-ROM, or other forms of RAM or ROM. Further, the steps of the disclosed methods may be modified in various ways, including by reordering steps and/or inserting or deleting steps, without departing from the principles of the invention.

It is intended that the specification and examples be considered as exemplary only, with a true scope and spirit of the invention being indicated by the following claims.

We claim:

1. An information gathering method performed by one or more processors at an information distributor, the method comprising:
   identifying a routing rule associated with a package for delivery from a specific source to a specific destination, the routing rule reflecting at least one of a data collection or transportation requirement associated with the package;
   determining a plurality of possible delivery routes for the package, wherein each possible delivery route is from the specific source to the specific destination;
   selecting a preferred delivery route from the plurality of possible delivery routes based on the routing rule and an amount of sensor-collectable data expected to be collected along each of the plurality of possible delivery routes;
   determining one or more location-based restrictions associated with the selected delivery route;
   providing the one or more location-based restrictions to a sensor located within or in proximity to the package;
   receiving sensor data from the sensor; and
   restricting access to the sensor data associated with the sensor violating the one or more location-based restrictions.

2. The method of claim 1, wherein the routing rule reflects maximizing an amount of sensor-collectable data collected along the plurality of possible delivery routes for delivery of the package.

3. The method of claim 1, further comprising identifying a set of conflicting collection rules among a first set of the one or more location-based restrictions on collecting data, and wherein determining the one or more location-based restrictions comprises
   giving precedence to a jurisdictional restriction over an institutional restriction within the set of conflicting collection rules.

4. The method of claim 1, wherein restricting access to the sensor data associated with the sensor further comprises providing, over a network, an instruction to the sensor preventing collection of the sensor data.

5. The method of claim 1, further comprising receiving the sensor data from the sensor over a network, and wherein restricting access to the sensor data associated with the sensor further comprises deleting or obfuscating the sensor data at the information distributor, and wherein obfuscating the sensor data comprises storing the sensor data in a format rendering the sensor data unreadable.

6. The method of claim 3, further comprising identifying a second set of the one or more location-based restrictions on collecting data associated with the selected delivery route, and wherein identifying the set of conflicting collection rules comprises identifying conflicts among the first set of the one or more location-based restrictions and the second set of the one or more location-based restrictions.

7. The method of claim 1, wherein the sensor data includes environmental data associated with the package.

8. An information gathering system at an information distributor, the system comprising: a memory storing instructions; and one or more processors configured to execute the instructions such that, when executed, cause the processors to perform the following operations:
   identifying a routing rule associated with a package for delivery from a specific source to a specific destination, the routing rule reflecting at least one of a data collection or transportation requirement associated with the package;
   determining a plurality of possible delivery routes for the package, wherein each possible delivery route is from the specific source to the specific destination;
   selecting a preferred delivery route from the plurality of possible delivery routes based on the routing rule and an amount of sensor-collectable data expected to be collected along each of the plurality of possible delivery routes;
   determining one or more location-based restrictions associated with the selected delivery route;
   providing the one or more location-based restrictions to a sensor located within or in proximity to the package;
   receiving sensor data from the sensor; and
   restricting access to the sensor data associated with the sensor violating the one or more location-based restrictions.

9. The system of claim 8, wherein the routing rule reflects collecting a type of the sensor-collectable data along the plurality of possible delivery routes.

10. The system of claim 8, wherein the method further comprises identifying a set of conflicting collection rules among a first set of the one or more location-based restrictions on collecting data, and wherein determining the one or more location-based restrictions comprises
giving precedence to a restriction with a stricter requirement within the set of conflicting collection rules.

11. The system of claim 8, wherein restricting access to the sensor data associated with the sensor further comprises restricting an encryption of sensor-collectable data based on location information.

12. The system of claim 8, wherein the method further comprises receiving the sensor data from the sensor over a network, and wherein restricting access to the sensor data associated with the sensor further comprises deleting or obfuscating the sensor data at the information distributor, and wherein obfuscating the sensor data comprises storing the sensor data in a format rendering the sensor data unreadable.

13. The system of claim 10, wherein the method further comprises identifying a second set of the one or more location-based restrictions on collecting data associated with the selected delivery route, and wherein identifying the set of conflicting collection rules comprises identifying conflicts among the first set of the one or more location-based restrictions and the second set of the one or more location-based restrictions.

14. The system of claim 8, wherein the sensor data includes environmental data within the package.

15. A sensor located inside or in proximity to a package, the sensor comprising:
a detecting portion for collecting data associated with a package;
a memory storing instructions; and
at least one processor configured to execute the instructions such that, when executed, cause the processor to perform the following operations:
identifying a routing rule associated with a package for delivery from a specific source to a specific destination, the routing rule reflecting at least one of a data collection or transportation requirement associated with the package;
determining a plurality of possible delivery routes for the package, wherein each possible delivery route is from the specific source to the specific destination;
selecting a preferred delivery route from the plurality of possible delivery routes based on the routing rule and an amount of sensor-collectable data expected to be collected along each of the plurality of possible delivery routes;
determining one or more location-based restrictions associated with the selected delivery route;
storing the one or more location-based restrictions; and
restricting access to sensor data collected via the detecting portion violating the one or more location-based restrictions.

16. The sensor of claim 15, wherein the routing rule reflects requiring the plurality of possible delivery routes to comply with a transportation of goods rule based on contents of the package.

17. The sensor of claim 15, wherein the method further comprises identifying a set of conflicting collection rules among a first set of the one or more location-based restrictions on collecting data, and wherein determining the one or more location-based restrictions comprises at least one of:
giving precedence to a jurisdictional restriction over an institutional restriction within the set of conflicting collection rules; or
giving precedence to a restriction with a stricter requirement within the set of conflicting collection rules.

18. The sensor of claim 15, wherein restricting access to the sensor data associated with the sensor further comprises preventing collection of the sensor data by the detecting portion.

19. The sensor of claim 15, wherein the method further comprises deleting or obfuscating the sensor data at the sensor, and wherein obfuscating the sensor data comprises storing the sensor data in a format rendering the sensor data unreadable.

20. The sensor of claim 17, wherein the method further comprises identifying a second set of the one or more location-based restrictions on collecting data associated with the selected delivery route, and wherein identifying the set of conflicting collection rules comprises identifying conflicts among the first set of the one or more location-based restrictions and the second set of the one or more location-based restrictions.

* * * * *